UNITED STATES PATENT OFFICE.

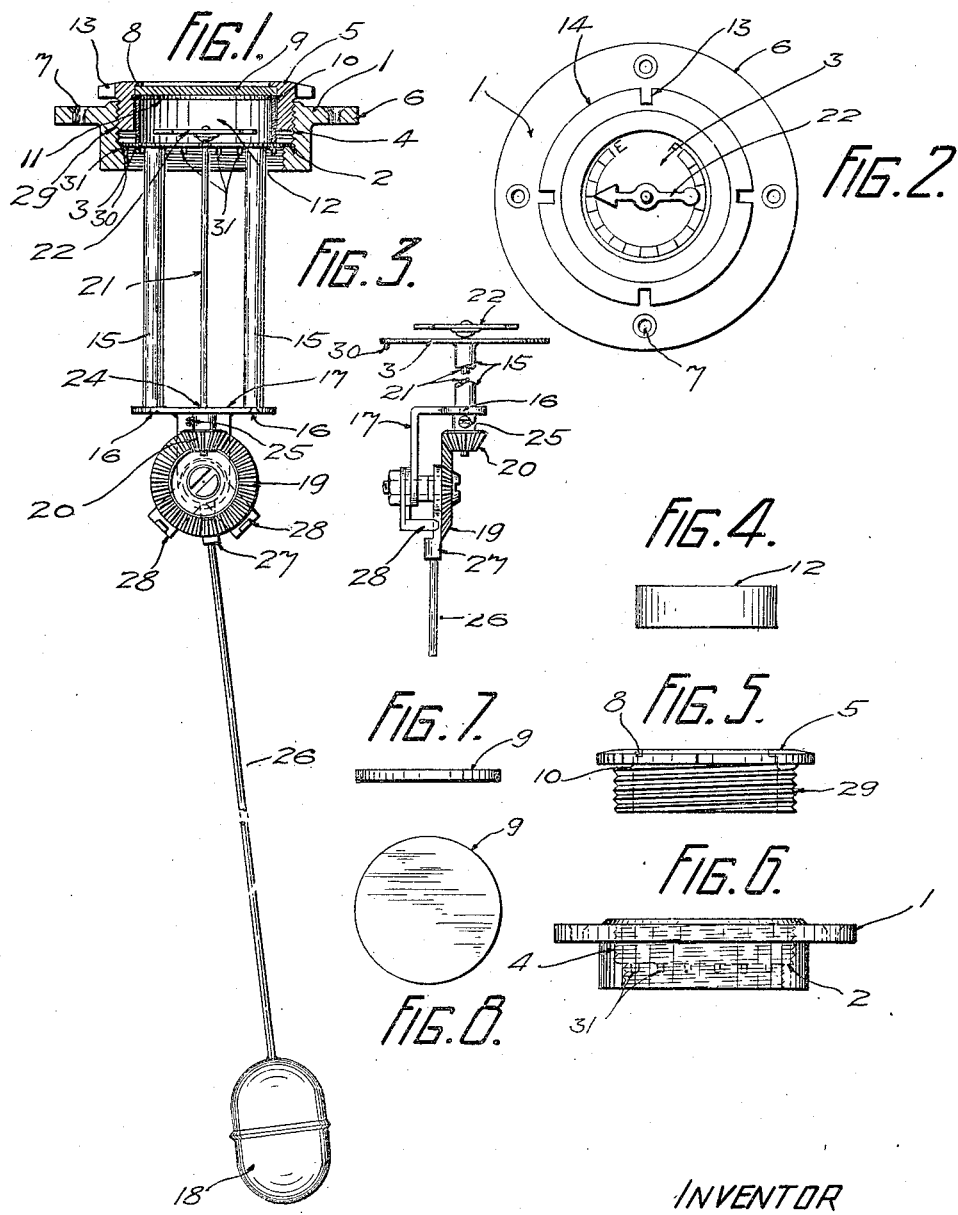

ALBERT F. HORTON, OF WAKEFIELD, MASSACHUSETTS, ASSIGNOR TO BOSTON AUTO GAGE COMPANY, OF BOSTON, MASSACHUSETTS, A CORPORATION OF MASSACHUSETTS.

LIQUID-GAGE.

1,278,469.   Specification of Letters Patent.   Patented Sept. 10, 1918.

Application filed December 27, 1915. Serial No. 68,602.

*To all whom it may concern:*

Be it known that I, ALBERT F. HORTON, a citizen of the United States, residing at Wakefield, in the county of Middlesex and State of Massachusetts, have invented an Improvement in Liquid-Gages, of which the following description, in connection with the accompanying drawings, is a specification, like letters on the drawings representing like parts.

The invention to be hereinafter described relates to fluid gages for indicating the level of a fluid in a tank or container and more particularly to that character of gage described in Patent No. 1,141,499, dated June 1, 1915, granted to C. W. Stahle.

One object of the present invention is to strengthen and simplify the construction of the support for the gear mechanism of the gage, and to simplify and cheapen the method of holding the glass or other transparent front and gage dial conjointly in place by means of a floating member or sleeve interposed between them. Another object of the invention is to simplify and cheapen the construction of the head and the means for connecting it to the tank or receptacle.

These and other objects of the invention will be more fully described in the accompanying drawings and description, in which one good form of means is shown for carrying the present invention into practical effect, it being understood that the invention in its true scope is not limited to the details thereof, but is definitely expressed by the appended claims.

In the drawings, wherein similar figures of reference denote corresponding parts:—

Figure 1 illustrates a side elevation of the gage with the end or head portion partly in section to more fully disclose the construction thereof;

Fig. 2 illustrates a top plan view of the head portion of the gage;

Fig. 3 is a partial side elevation of the gage, substantially at right angles to that shown in Fig. 1;

Fig. 4 shows a side elevation of the tubular member to be interposed between the dial plate and the glass or other transparent cover;

Fig. 5 is a side elevation of that part of the gage employed to hold the glass or other transparent cover in place;

Fig. 6 is a side elevation of the head portion of the gage to be fastened to the tank or liquid receptacle; and Figs. 7 and 8 show, respectively, a side elevation and plan view of the glass or other transparent cover.

The gage may be constructed of any suitable material or materials and in the form of means shown, consists of the gage head 1, of general form, illustrated in Figs. 1, 2 and 6 of the drawings, provided with a shoulder 2 or other suitable supporting means upon which the gage dial 3 may rest. The interior portion above said shoulder or supporting means is preferably interiorly screw-threaded as at 4, to receive the exteriorly threaded locking member 5, whereby suitable adjustable connection is made between the gage head 1 and the locking member 5. The gage head 1 is preferably formed with a flange such as the flange 6 and fits into an opening in the tank, the flange overlapping the opening and secured to the tank by means of suitable fastenings, such as rivets passing through the holes 7 and the material of the tank. It is obvious, however, that the gage head 1 is not restricted to the particular form disclosed, nor to the particular means of fastening it to the tank, but may, within the true scope of the invention, be used in other forms and other means of securing it to the said tank may be employed, and that the said gage head may be constructed by various processes such as by die-stamping, or by casting, or otherwise.

The locking member 5 is preferably of the general shape illustrated in Figs. 1, 2 and 5, and on its interior portion, is provided with the shoulder 8 or other suitable engaging means to contact, near the edge, with the upper surface of the cover 9 composed preferably of glass or other transparent material. The member 5 is provided with suitable engaging means with the head 1 such as the exterior screw threads 29 formed to engage the interior screw threads 4 of the head 1. A small annular groove or recess is also preferably provided in the locking member 5, such as the recess 10 to more conveniently hold in place a soft washer 11 which it may be desirable to interpose between the transparent cover 9 and the tubular member 12. This washer may be of any suitable material such, for instance, as fiber, rubber, fabric, or leather, and its function is to present more or less yielding contact between the transparent cover 9 and the tubular member 12, when the member 5 is positioned down into place.

Recesses 13 may be provided in a flanged portion 14 of the locking member 5, as one good form of means to enable a suitable tool to be used in screwing this member into or out of position without marring it. From the construction described, it will be apparent that when the dial plate 3 is positioned to rest on the shoulder 2 and the floating member or sleeve 12 is placed to rest between the dial plate and the cover 9, the locking member 5 may be screwed down to force the cover 9 to bear upon the member 12, preferably through the medium of the soft washer 11, and that by means of the member 12 both the dial plate 3 and the cover 9 are forced firmly against the shoulders 2 and 8 respectively, and are held conveniently and in a positive manner in their proper places.

It is important to hold the gear mechanism of the gage, the gage head and the dial plate in rigid relation to one another, and to rigidly support the shaft 21 at or near its extremities so that it may be free to easily turn without binding. An improved means to this end consists in providing the columns or rod members 15 appropriately secured to the dial plate and to the gear bracket 17 which is used for holding said gear mechanism.

The columns 15 are illustrated in Figs. 1 and 3 as cylindrical rods preferably soldered at one extremity to the dial plate 3 and with reduced portions 16 at their other extremity riveted into the gear bracket or member 17 for holding the gage gear mechanism. It is apparent, however, that other forms of rods 15 and other means of securing them may be used with good, practical results within the true scope of the invention, the distinguishing feature of these rods being that they are placed with their long axes substantially in the plane in which the float 18 swings, or in a plane substantially parallel to that in which the float swings and thereby give increased strength and rigidity in the direction most desired, without the inconvenience of large and heavy or awkward parts, so that the bevel gear 19 may operate the bevel pinion 20, and through the bevel pinion, the shaft 21 and indicator 22, without producing binding between the gear and pinion or transmitting undesirable stresses to the shaft 21. A more accurate and even registering of the gage is thereby effected, as well as a simple, light, positive and economical construction being obtained.

In the drawings, the rods 15 are shown as secured to the dial 3, but it will be apparent that these rod members may be secured to the gage head with good results and within the true scope of the invention.

The remainder of the gage being substantially as constructed by C. W. Stahle, in Patent No. 1,141,499, June 1, 1915, hereinbefore referred to, a brief description thereof will suffice.

The indicator or needle 22 is appropriately secured to turn with the shaft 21 which passes through a hole or bearing in the dial plate 3 and through a bearing 24 in the gear bracket 17. A bevel pinion 20 is secured to the shaft 21 by means of a set screw 25 in the hub of the pinion, which meshes with the bevel gear 19 which, in turn, is held in a suitable bearing by the gear bracket 17 and is permitted to turn independently of the gear bracket 17. The float 18 is connected to swing with the bevel gear 19 by means of the float rod 26 and connecting part 27.

Adjustable stops 28 are also provided when desirable, to limit the swing of the float 18 by contact between the part 27 and a stop.

It is obvious that any alteration in the level of the liquid upon which the float rests will produce movement of the float which, by means of the rod 26, is transmitted as a turning movement to the bevel gear 19, which, being in meshing engagement with the pinion 20, transmits turning movement to it and thence through the shaft 21 to the indicator or needle 22 which will register said alteration of the liquid level in the tank by altered position relative to the dial plate 3.

In the form of the invention shown, it will be noted that engaging means is provided between the dial 3 and the gage head 1 whereby the dial 3 may be held adjustably in positive coöperative relation to the gage head and permit the plane in which the float 18 swings to be altered as may be desirable by reason of alteration of the plane of the fluid in the tank.

In its preferred form this engaging means consists of the projection 30 on the dial 3, Figs. 1 and 3, and recesses 31 in the gage head 1, Figs. 1 and 6, the dial being held adjustably in positive coöperative relation to the gage head by engagement of the projection 30 in one of the recesses 31.

What is claimed is:—

1. In a fluid gage, the combination of a head having an opening therein and an inturned shoulder; a dial plate supported on said shoulder; a transparent cover; a locking ring threaded to said head internally thereof and having an inwardly projecting member extending over a portion of the outer surface of said cover, and a sleeve within said locking ring between said dial and cover to hold both the dial and cover in position when said locking ring is screwed in toward said shoulder.

2. In a fluid gage, the combination of a head adapted to be attached to a liquid containing tank, a dial connected to the head, an indicator coöperating with said dial, a float, and means adapted to cause said float to swing in a plane at substantially right angles to the free surface of the liquid in the tank including a float support comprising parallel supporting rods connected to the head and having their longer axes in a plane parallel to the swinging movement of the float.

3. In a fluid gage, the combination of a head, adapted to be connected to a liquid container, a dial connected to the head, a float, a shaft operatively connected to the float, a pointer or indicator controlled by the shaft to indicate the liquid level in the container through movement of the float, and means adapted to cause said float to swing in a plane at substantially right angles to the free surface of the liquid in the tank, including a float support comprising parallel supporting rods connected to the dial and having their longer axes in a plane parallel to the swinging movement of the float.

4. In a fluid gage, the combination of a gage head adapted to be secured to a liquid containing tank, a dial connected to the head, an indicator, a float, and means adapted to cause said float to swing in a plane at substantially right angles to the free surface thereof, the liquid in the tank including a float support comprising columns connected to the dial and having their longer axes in a plane parallel to the swinging movement of the float and means to permit the columns to be adjusted so that the plane containing their longer axes may be caused to assume different positions.

5. In a fluid gage, the combination of a gage head, a gage dial, an indicator coöperating with said dial, a gear bracket adapted to support intermeshing gears, a float, a gear, and means to permit swinging movement of the float in a plane including connections between the float and gear and rod members connecting the dial and bracket with their longer axes in a plane parallel to the plane of movement of the float.

6. In a fluid gage, the combination of a gage dial, an indicator coöperating with said dial, and means to actuate said indicator including a gear bracket, a bevel gear and pinion, supported thereon, and rod members secured to the dial and to the bracket with their long axes in a plane parallel to the turning axis of the bevel pinion.

7. In a fluid gage, the combination of a gage head provided with an opening and adapted to contain and support a dial, engaging means between the dial and the gage head to enable the dial to be held adjustable rotatively in positive coöperative engagement with the gage head, a cover, a locking member adapted to engage with the gage head and provided with means to bear upon a portion of the upper surface of the cover, and means between the cover and the dial to hold each in position when the locking member is in operative engagement with the gage head.

In testimony whereof, I have signed my name to this specification, in the presence of two subscribing witnesses.

ALBERT F. HORTON.

Witnesses:
J. W. YOUNG,
J. E. HAYES.

Copies of this patent may be obtained for five cents each, by addressing the "Commissioner of Patents, Washington, D. C."